METHOD FOR SPUTTER DEPOSITING DIELECTRIC MATERIALS
Filed March 15, 1971
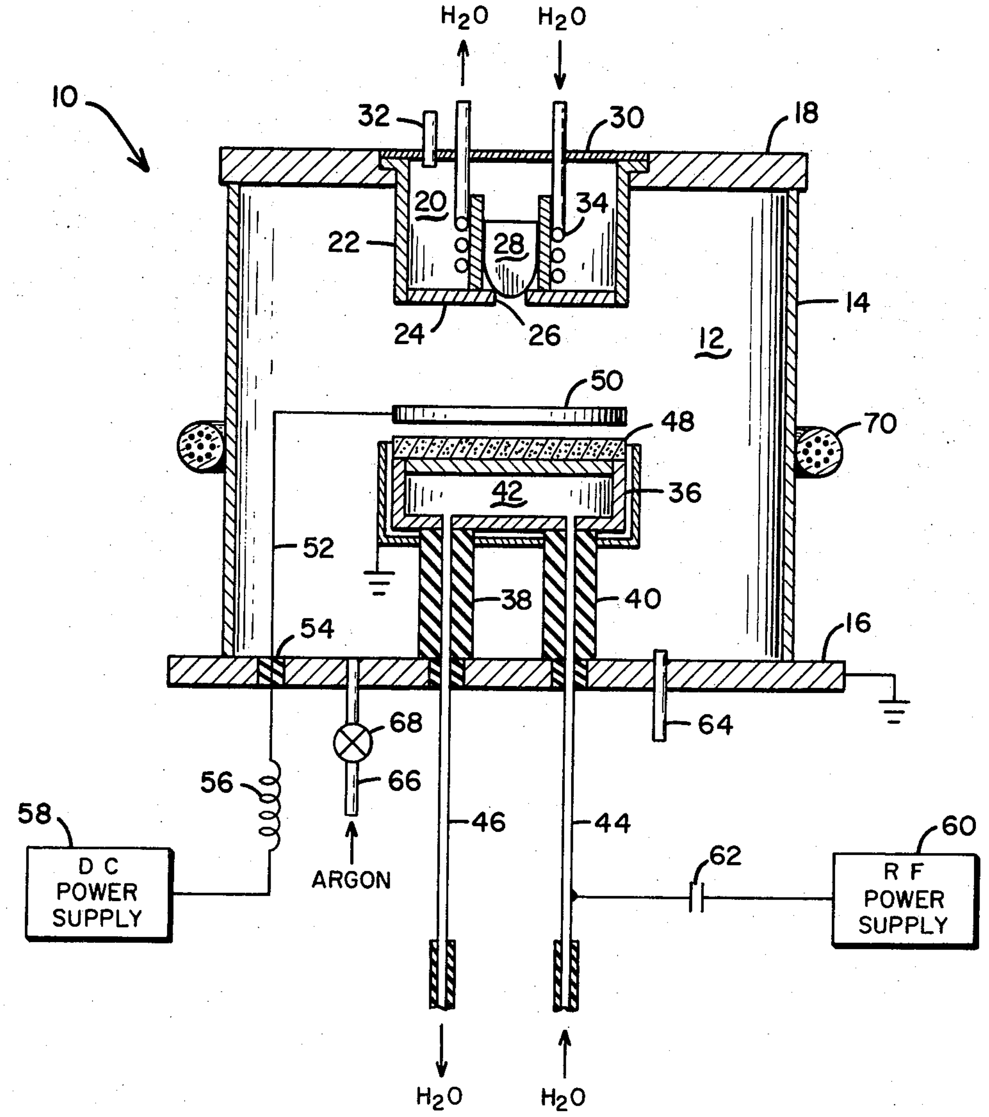
INVENTORS
STANLEY J. LINS
CHARLES J. NELSON
BY Thomas J. Nikolai
ATTORNEY 3,699,034

METHOD FOR SPUTTER DEPOSITING DIELECTRIC MATERIALS

Stanley J. Lins, Minneapolis, and Charles J. Nelson, Rosemount, Minn., assignors to Sperry Rand Corporation, New York, N.Y.

Filed Mar. 15, 1971, Ser. No. 124,093
Int. Cl. C23c *15/00*
U.S. Cl. 204—192 3 Claims

ABSTRACT OF THE DISCLOSURE

A method for preparing a substrate for the subsequent receipt of a dielectric coating wherein the substrate to be coated is first subjected to bombardment of positive ions which cause impurities on the substrate to be dislodged, and attracted to a shutter member. After the substrate has been cleaned in this fashion, the shutter member is removed and the direction of ion travel is reversed causing the dielectric material to be sputtered onto the substrate.

BACKGROUND OF THE INVENTION

Many methods and devices are known in the art for effecting the deposition of a material onto a substrate. For example, the Davidse et al. Patent 3,525,680 illustrates a typical apparatus for vacuum sputtering a dielectric material onto a substrate. In this arrangement, a prepared (cleaned) substrate is located within an evacuable chamber and maintained at ground potential. The chamber is pumped down to a predetermined level of vacuum and a radio frequency energy source is coupled through a capacitor to the source of material to be deposited upon the substrate. In operation, an inert ionizable gas is introduced into the chamber at the same time that the radio frequency source is activated. The dielectric material is bombarded by ions and is sputtered free from the source and follows a path to the substrate on which the material condenses.

In a pending application of Thomas R. Appleton et al., Ser. No. 38,423, filed May 18, 1970, and assigned to the assignee of the present invention, there is described a method or process for depositing silicon monoxide on a surface of a magnetic transducing head to increase the normal life of the head. In carrying out this method, the head to be treated is located in an evacuable chamber and serves as a substrate. Prior to the step of depositing the dielectric (silicon monoxide) material, the head is first treated in situ by ion scrubbing to clean the surface of the substrate (head) where the nonconductive layer of material is to be deposited. This is accomplished by establishing a relatively high potential difference between an ion scrubbing electrode and the surface to be cleaned. The ions bombard the surface being treated to dislodge molecules of foreign matter and contamination which may be present on the head.

It is found that the ion scrubbing step carried out in accordance with the teachings of the aforereferenced Appleton application is not totally effective because of an energy loss suffered by the ions due to their collision with other ions and with molecules of surface material dislodged from the substrate being cleaned. As a result, the cleaning is imperfect which affects the adhesion of the deposited material to the substrate. Further, because of the poorly defined electric field configuration obtained with the Appleton apparatus material bombarded loose from the substrate may settle back onto the substrate.

The method of vacuum sputtering described and claimed herein obviates the problem exhibited in the prior art. More specifically, the modification of the apparatus by including a positionable shutter in the space between the source of material to be deposited and the surface on which deposition is to take place with the relative distances being critical, a plasma discharge is first established between the removable shutter and the surface being treated with a well defined "dark space" in a zone immediately adjacent to the substrate. Since in the dark space there is an absence of ionized particles, there is a minimization of the energy loss to the ions which would otherwise be occasioned through collision. Hence, the kinetic energy of the ions striking the substrate to be treated is high. The particles of the substrate and of contamination on the substrate that are broken loose through ion bombardment are directed at and collected by the positionable shutter. This prevents contamination of the various parts in the system and thereby permits continuous use over longer periods of time with a minimum of maintenance. Also, because of the degree of improvement in the cleaning step, the dielectric coating adhesion property is superior to that obtained using prior art methods.

OBJECTS

Accordingly it is an object of the present invention to provide an improved method and apparatus for applying a dielectric coating to a substrate in a vacuum sputtering process.

Another object of the invention is to provide an improved method for cleaning a substrate in situ prior to the vacuum sputtering deposition of a material thereon.

Another object of the invention is to provide a movable shutter electrode between the source of material to be deposited and the subtrate surface on which condensation is to take place such that a degree of control can be exerted over the ionization process.

DESCRIPTION OF DRAWING

These and other objects of the invention will become apparent to those skilled in the art from the following detailed description and reference to the accompanying drawing illustrating a preferred system for carrying out the invention.

DETAILED DESCRIPTION OF THE INVENTION

Referring to the figure, there is shown a vacuum system indicated generally by numeral 10 which includes a cylindrical casing 14 mounted upon a base plate 16 and having a cover number 18 secured to the top of the casing. Since a high vacuum is to be maintained within the chamber 12 defined by the casing 14 the base plate 16 and the cover 18, it is necessary to provide suitable gaskets at the junction between the casing 14 and the base plate and top member, but since such detail would only tend to complicate the drawing, these gaskets are not specifically illustrated.

The disc shaped top member 18 has a circular hole formed therein which is adapted to receive a second vacuum chamber 20 defined by cylindrical sidewalls 22 and a disc shaped bottom plate 24 which is secured to the sidewalls 22 by welding or other suitable means. The bottom plate 24 of chamber 20 has an aperture 26 formed therein which serves as a mask to define the shape of the surface of the substrate to be treated.

As in the aforereferenced Appleton et al. application, the substrate may comprise a magnetic transducing head 28 and is positioned with respect to the aperture 26 such that the magnetic cores and associated pole pieces are exposed to the vacuum chamber 10. However, the method of this invention can be applied in forming a dielectric coating on other surfaces so that limitation to the treatment of recording heads is not intended. Cooperating with the upper end of chamber 20 is a cover plate 30 which serves to seal the chamber 20. A suitable vacuum connection 32 passes through the plate 30 and is adapted to be connected to a vacuum pump (not shown).

In order to regulate the temperature of the substrate to be treated, cooling means may also be provided. As is illustrated in the figure, the cooling means comprises a coil of copper tubing 34 which surrounds the substrate. Water or some other fluid may then be passed through the tubing to carry away the heat.

Mounted upon the base plate 16 is a source material holding device 36 which in the preferred embodiment comprises a hollow disc shaped container mounted upon insulating pedestals 38 and 40 which, in turn, abut the base plate 16. Communicating with the hollow chamber 42 within the disc shaped source material holder 36 are copper tubes 44 and 46. As was the case with the chamber 20, the tubes 44 and 46 communicating with the chamber 42 permit a cooling fluid to be introduced so as to maintain the source material at a desired temperature.

The source material, i.e., the dielectric material to be vacuum sputtered on the substrate, rests upon the upper surface of the holder 36 and in the figure is identified by numeral 48.

Located above the source material 48 a predetermined distance, *d*, is a positionable shutter member 50. When in a first position, the shutter 50 shields the source material 48 from the substrate holding chamber 22, but when moved to its alternate position, the source 48 is completely exposed to the substrate holder 22 and accompanying substrate 28.

The rotatable shutter 50 is electrically connected through conductor 52 which passes through an insulated feed through 54 formed in the base plate 16 and a radio frequency choke 56 to a direct current power supply 58. A radio frequency power supply 60 is coupled through a capacitor 62 to the conductive (copper) tubing 44 which, in turn, connects to the conductive source material holding member 36.

A connection 64 passes through the base plate 16 to communicate with the vacuum chamber 12 and is adapted to be connected to a suitable vacuum pump (not shown). A connection 66 having a control valve 68 therein also passes through the base plate 16 so as to communicate with the chamber 12. The connection 66 is adapted to be connected to a source of an inert gas such as argon.

Finally, a coil of wire 70 having a predetermined number of turns is disposed on the outside of the casing 14 and is adapted to be supplied with a direct current so as to establish a magnetic field within the chamber 12.

Now that the details of the apparatus employed in carrying out the method of the present invention has been described, attention will be given to the mode of operation of this apparatus.

The function of the apparatus previously described is to allow a coating of a dielectric material to be formed on the surface of a substrate. Additionally, the apparatus is designed to permit the substrate to be prepared by cleaning in advance of the deposition step so that the resulting dielectric film applied thereto will have superior adhesion characteristics.

In carrying out the method, the dielectric material to be deposited is first positioned upon the upper surface of the source material holder 36 and a substrate (here shown as a magnetic transducing head 28) is positioned in the chamber 20 with the area to be coated exposed through the aperture 26 formed in the bottom wall 24 of the chamber 20. In practice, the substrate 28 is located directly above the source material 48 a distance in the range of 1.5 to 2.5 inches.

Next, the rotatable shutter element 50 is positioned a predetermined distance, *d*, above the surface of the source material 48 so as to shield the material 48 from the substrate. The vacuum pumps communicating with the chambers 12 and 20 are then activated and the pressure within these two chambers is reduced to a predetermined value. The reason for containing the substrate 28 in a separate evacuable chamber 20 is to limit the amount of contamination existing on the substrate that enters the deposition chamber 10 since excessive amounts will deleteriously affect the deposition process. For example, when treating a magnetic head, the electrical fittings and leads as well as the head block contribute to the contamination.

Next, the radio frequency power supply 60 is activated and a RF potential of approximately 2,000 volts is established between the source material holder 36 and the substrate 28 which is maintained at ground potential.

Next, the direct current power supply 58 is activated and a direct current potential in the range of 800 to 1,000 volts is applied between the substrate 28 and the rotatable shield or shutter 50. Because the shutter 50 and the source material holder 36 are both formed from a conductive material and because the source material 48 is an insulator, the RF signal produced by the power supply 60 and coupled to the source material holder 36 by way of the condenser 62 and the conductive tubing 44 is capacitively coupled to the rotatable shutter member 50. Hence, the net potential existing between the shutter 50 and the substrate 26 is a 2,000 volt alternating current swing about a 800 to 1,000 volt DC bias level. The RF choke 56 blocks the high frequency signals and prevents them from interacting with the circuits of the DC power supply 58.

With these potentials applied and with the pressure within the chamber 12 reduced to a predetermined level (e.g., $10\times10^{-3}$ to $25\times10^{-3}$ torr) and a quantity of an inert gas such as argon introduced through inlet tube 66 and control valve 68, the argon gas will be ionized and a plasma discharge will exist between the shutter member 50 and the substrate chamber 24 and substrate 28. It has been found that most of the potential drop between the shutter 50 and the substrate holder 24 and substrate 28 exists across this dark space so that the ions existing in the plasma discharge are rapidly accelerated upon entering the dark space and impinge upon the substrate at a relatively high velocity sufficient to dislodge molecules of impurities and particles of the substrate from the surface of the substrate. Because of the geometry employed in the deposition apparatus 10, the particles of the substrate and impurities thereon are directed downward and primarily collect upon the shutter element 50.

After a predetermined time, say 10 to 15 minutes, the ion bombardment will have completely cleaned the surface of the substrate 28 exposed through the aperture 26 and prepared it for the subsequent deposition of dielectric material thereon. Hence, the direct current supply 58 may be turned off and the rotatable or positionable shutter member 50 may be moved out of the position illustrated to a position which does not block the path between the source material 48 to be deposited and the substrate 26. Next, the radio frequency voltage applied to the holder 36 is increased so as to increase the deposition rate to a desired practical level. The plasma discharge will be maintained, but it will be observed that the cathode dark space will have moved from its former position in close proximity to the substrate 26 to a position closely adjacent to the surface of the material to be deposited 48. The net effect is to cause the direction of ion flow to reverse and impinge upon the dielectric source material 48 thereby sputtering away the material. Again, because of the geometry of the system, this material will be directed upwards and will condense upon or coat the portion of the substrate 28 exposed through the aperture 26 in the chamber wall 24.

As has already been mentioned, if it is desired to control the temperature of either the substrate 28 or the source material 48, water or some other suitable cooling fluid may be introduced into the tubing 34 or 44 to carry away the heat from the chamber.

The spacing, *d*, between the positionable electrode 50 and the source material 48 is quite critical and should lie in the range of 0.25 to 0.5 inch in a system where the spacing between the source material holder 36 and the substrate 28 is approximately 1.5 to 2.5 inches. This will insure that control can be maintained over the direction of ion flow and the location of the cathode dark space.

It has also been found expedient to apply a magnetic field to the deposition chamber during the sputtering step so as to confine or focus the ion flow to a prescribed path. The magnetic field can be established in a conventional fashion by applying a predetermined DC current to the winding 70 surrounding the deposition chamber 14.

It should be apparent to those skilled in the art that variations may be made in the specific arrangement of the sputtering apparatus, without departing from the spirit and scope of the invention as set forth in the following claims.

What is claimed is:

1. A method of applying a dielectric material to a substrate comprising the steps of:

(a) locating a source of dielectric material to be deposited in an evacuable chamber;

(b) disposing a substrate to be coated a predetermined distance in the range of 1.5 to 2.5 inches above said source;

(c) disposing a positionable shutter member between said source and said substrate a predetermined distance, *d,* in the range of 0.25 to 0.5 inch above said source;

(d) evacuating said chamber to a predetermined pressure;

(e) applying predetermined radio frequency potential between said source and said substrate;

(f) simultaneously applying a predetermined direct current potential between said shutter member and said substrate such that a plasma discharge is established therebetween, said plasma discharge including a cathode dark space immediately adjacent said substrate;

(g) subsequently removing said direct current potential and said positionable shutter from its location between said source and said substrate; and (h) increasing the radio frequency potential between said source and said substrate to cause said cathode dark space to move to a position immediately adjacent to said source, the method being such that during step (e) positive ions bombard said substrate to dislodge surface impurities therefrom and during step (h) the ions bombard said source to cause sputtering of said dielectric material onto said substrate.

2. A method as in claim 1 wherein said dielectric material is silicon monoxide.

3. The method as in claim 1 and further including the step of applying a magnetic field to said evacuable chamber during steps (f) and (g) to control the path through which said ions travel.

References Cited

UNITED STATES PATENTS

| | | | |
|---|---|---|---|
| 3,451,912 | 6/1969 | D'Hevrle et al. | 204—192 |
| 3,461,054 | 8/1969 | Vratny | 204—192 |
| 3,480,535 | 11/1969 | Bloom | 204—192 |
| 3,515,663 | 6/1970 | Bodway | 204—192 |
| 3,528,906 | 9/1970 | Cash et al. | 204—192 |
| 3,530,055 | 9/1970 | Maissel et al. | 204—192 |

JOHN H. MACK, Primary Examiner

S. S. KANTER, Assistant Examiner

U.S. Cl. X.R.

204—298